(12) United States Patent
Payne

(10) Patent No.: US 6,958,818 B1
(45) Date of Patent: Oct. 25, 2005

(54) FABRY-PEROT INTERFEROMETER INCLUDING MEMBRANE SUPPORTED REFLECTOR

(75) Inventor: Alexander Payne, Ben Lomond, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 299 days.

(21) Appl. No.: 10/323,560

(22) Filed: Dec. 18, 2002

(51) Int. Cl.[7] .................................................. G01B 9/02
(52) U.S. Cl. ...................................................... 356/519
(58) Field of Search ................................ 356/454, 480, 356/519; 372/32; 359/577, 578, 585, 586, 359/589

(56) References Cited

U.S. PATENT DOCUMENTS

| | | | | |
|---|---|---|---|---|
| 5,739,945 A | * | 4/1998 | Tayebati | 359/291 |
| 6,295,130 B1 | * | 9/2001 | Sun et al. | 356/454 |
| 6,307,691 B1 | * | 10/2001 | Goossen | 359/885 |
| 6,590,710 B2 | * | 7/2003 | Hara et al. | 359/579 |

* cited by examiner

*Primary Examiner*—Gregory J. Toatley, Jr.
*Assistant Examiner*—Michael A. Lyons
(74) *Attorney, Agent, or Firm*—Okamoto & Benedicto LLP

(57) ABSTRACT

An interferometer comprises a membrane, a substrate, and a support structure. The membrane comprises a first reflector. The substrate comprises a second reflector. The support structure circumferentially couples the membrane to the substrate and orients the first reflector parallel to and facing the second reflector.

20 Claims, 4 Drawing Sheets

FABRY-PEROT INTERFEROMETER INCLUDING MEMBRANE SUPPORTED REFLECTOR

FIELD OF THE INVENTION

This invention relates to the field of Fabry-Perot interferometers. More particularly, this invention relates to the field of Fabry-Perot interferometers having a micro-electro-mechanical structure.

BACKGROUND OF THE INVENTION

Charles Fabry and Alfred Perot invented the Fabry-Perot interferometer in the late 1800's. The Fabry-Perot interferometer includes two glass plates that have been lightly silvered on facing surfaces. The glass plates are arranged parallel to each other so that the lightly silvered surfaces produce an interference cavity defined by a separation distance between the glass plates. If the separation distance is fixed, the Fabry-Perot interferometer is referred to as a Fabry-Perot etalon.

In either the Fabry-Perot interferometer or the Fabry-Perot etalon, the interference cavity causes multiple beam interference. The multiple beam interference occurs when first and second partially reflecting surfaces are oriented parallel to each other and illuminated by light. Provided that reflection coefficients for the first and second partially reflecting surfaces are not small, the light reflects between the two partially reflecting surfaces multiple times. This produces a transmitted multiple beam interference for the light exiting the second surface in a forward direction and a reflected multiple beam interference for the light exiting the first surface in a reverse direction.

If the Fabry-Perot interferometer is illuminated by a broad light source and the transmitted multiple beam interference is collected by a focusing lens, a circular interference pattern is produced on a screen at a focal length of the focusing lens. The circular interference pattern exhibits bright narrow rings of light separated by larger dark rings.

Goossen et al. in "Silicon modulator based on mechanically-active anti-reflection layer with 1 Mbit/sec capability for fiber-in-the-loop applications," *IEEE Phtonics Technology Letters*, Vol. 6, No. 9, September 1994, pp. 1119–1121, teach a mechanical anti-reflection optical switch. The optical switch consists of a $SiN_x$ membrane suspended over a Si substrate. The $SiN_x$ membrane has a square shape and is suspended from corners by arms. The $SiN_x$ layer has a thickness of a quarter wavelength of incident light. A $SiN_x$ index of refraction for the $SiN_x$ layer is a square root of a Si index of refraction for the Si substrate. When an air gap separating the $SiN_x$ membrane from the Si substrate is an even multiple of a quarter wavelength, an antireflection condition exists. When the air gap is an odd multiple of a quarter wavelength of the incident light, a high reflection condition exists. The optical switch is in an off-state when the anti-reflection condition exists and is an on-state when the high reflection condition exists.

Fabricating the $SiN_x$ membrane so that the $SiN_x$ index of refraction is the square root of the Si index of refraction is difficult. Further, fabricating the arms and the $SiN_x$ membrane in a reproducible manner so that production devices operate in a similar manner is difficult. Moreover, it is desirable to have an optical switch which is more economical to produce than the optical switch taught by Goossen et al.

Miles, in U.S. Pat. No. 5,835,255 issued on Nov. 10, 1998 and entitled, "Visible Spectrum Modulator Arrays," teaches a micro-fabricated interferometric light modulator. The micro-fabricated interferometric light modulator includes a transparent substrate and a rectangular membrane suspended above the substrate. The transparent substrate includes first and second surfaces, and also includes a transparent film on the second surface. The transparent film is conductive. A mirror, either a metal or dielectric mirror, lies on the transparent film. The membrane is suspended above the mirror by parallel support structures, which support two edges of the rectangular membrane. The membrane is both reflective and conductive. The membrane and the mirror form an interferometric cavity which is modulated by biasing the membrane relative to the transparent film. In operation, the micro-fabricated light modulator modulates light incident upon the first surface of the transparent substrate by interferometrically causing the incident light to exit the first surface or by interferometrically causing the incident light to not exit the first surface.

Miles further teaches an alternative micro-fabricated interferometric light modulator in which the membrane is a square membrane. The square membrane is suspended by arms from centers of each of four lengths defining the square membrane.

Fabricating the transparent and conducting film of the micro-fabricated light modulators is difficult. Further, keeping a separation distance defining the interferometric cavity of the micro-fabricated light modulators constant across the interferometric cavity is difficult. Additionally, the combination of the rectangular membrane and the parallel support structures gives rise to a tendency for the rectangular membrane to deform cylindrically. The cylindrical deformation of the rectangular membrane reduces the effectiveness of the interferometric cavity. Moreover, it is desirable to have an interferometric light modulator which is less costly to manufacture and which is more reproducible than the micro-fabricated interferometric light modulators taught by Miles.

What is needed is an interferometric light modulator which is economical to fabricate, which is more easily reproducible in a production setting, which does not rely on a rectangular membrane supported by parallel support structures, and which does not rely on arms to support a moving surface.

SUMMARY OF THE INVENTION

The present invention is an interferometer. The interferometer comprises a membrane, a substrate, and a support structure. The membrane comprises a first reflector. The substrate comprises a second reflector. The support structure circumferentially couples the membrane to the substrate and orients the first reflector parallel to and facing the second reflector.

DETAILED DESCRIPTION OF THE EMBODIMENTS

Figure 1:
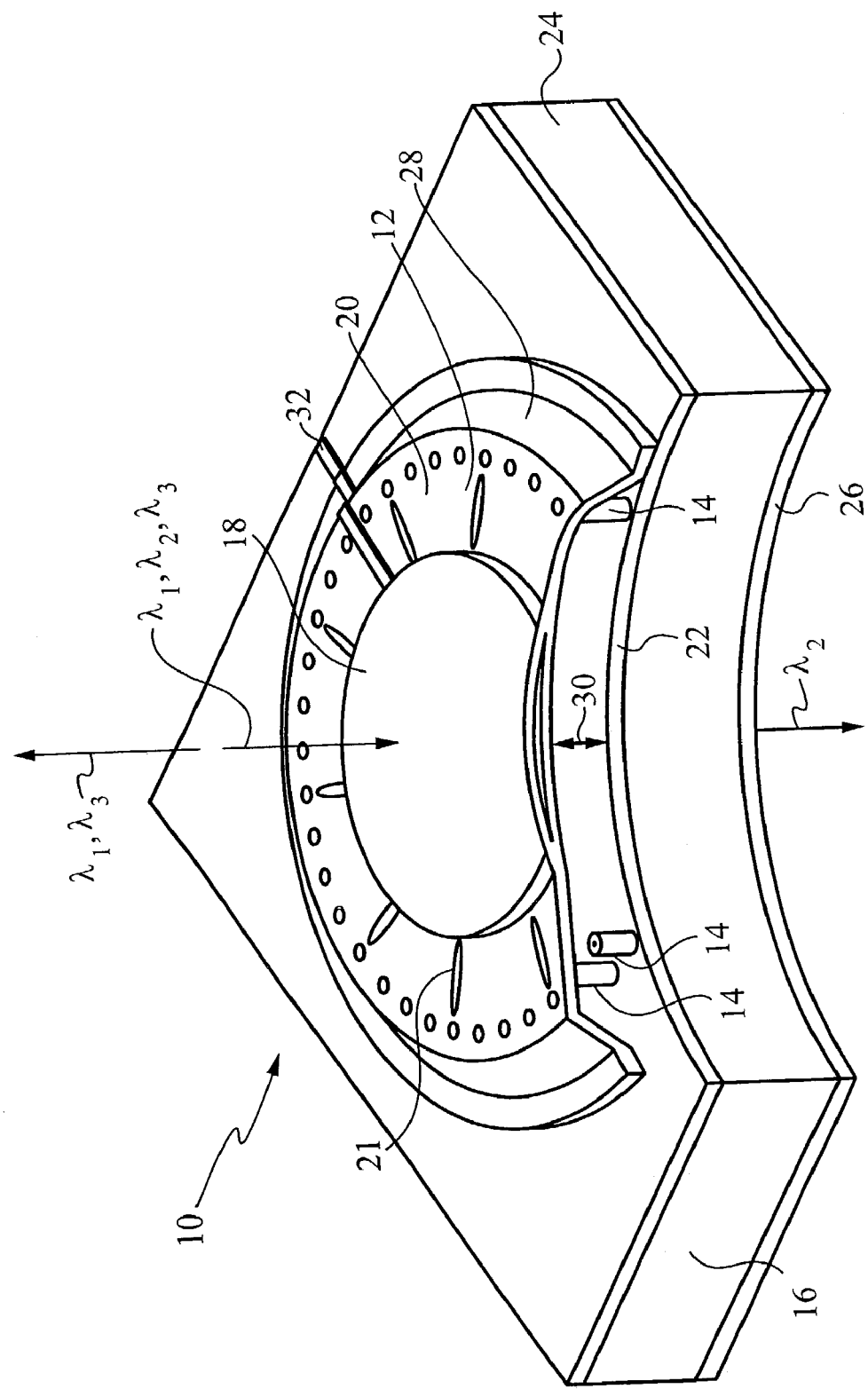
FIG. 1 isometrically illustrates the preferred interferometer of the present invention.

The preferred interferometer of the present invention is illustrated in FIG. 1. The preferred interferometer 10 comprises a membrane 12, a plurality of posts 14, and a substrate 16. The membrane 12 comprises a first reflector 18 and a flexible annular member 20. Preferably, the membrane 12 further comprises release slots 21. Alternatively, the membrane 12 does not include the release slots 21. The substrate 16 preferably comprises a second reflector 22, a transparent bulk material 24, and an anti-reflective coating 26. Alternatively, the substrate 16 does not include the anti-reflective coating 26.

In the preferred interferometer 10, the membrane 12 couples to the substrate 16 via the plurality of posts 14 and a membrane extension 28. The plurality of posts 14 and the membrane extension 28 hold the membrane 12 in bi-axial tension. The bi-axial tension in the membrane 10 maintains the first reflector 18 parallel to the second reflector 22. Preferably, the posts 14, the flexible annular member 20, the membrane extension 28 comprise a resilient material. Alternatively, only the flexible annular member 20 comprises the resilient material. Preferably, the resilient material comprises $Si_3N_4$. Alternatively, the resilient material comprises another material with resilient properties.

An advantage of the preferred interferometer 10 is that the biaxial tension in the membrane 10 results in the first reflector having a highly flat surface, which promotes parallelism of the first and second reflectors, 18 and 28.

The first reflector 18 includes a first conducting layer. An electrical conductor 32 couples to the first conducting layer, which provides an electrical biasing path for the first conducting layer. The second reflector 28 includes a second conducting layer. In the preferred interferometer 10, the first and second reflectors, 18 and 28, form an interferometric cavity 30. The interferometric cavity 30 is adjusted by electrically biasing the first conducting layer relative to the second conducting layer. This causes the first reflector 18 to move relative to the second reflector 22 adjusting a cavity length for the interferometric cavity 30.

The preferred interferometer 10 transmits light when the cavity length is an integral multiple of a half wavelength of the light. Otherwise the preferred interferometer 10 reflects light. If first, second, and third light wavelengths, $\lambda_1$, $\lambda_2$, and $\lambda_3$, are incident upon the preferred interferometer 10 and the cavity length is an integral multiple of only the second light wavelength $\lambda_2$, the second wavelength $\lambda_2$ transmits and the first and third light wavelegnths, $\lambda_1$ and $\lambda_3$, reflect.

Figure 2:
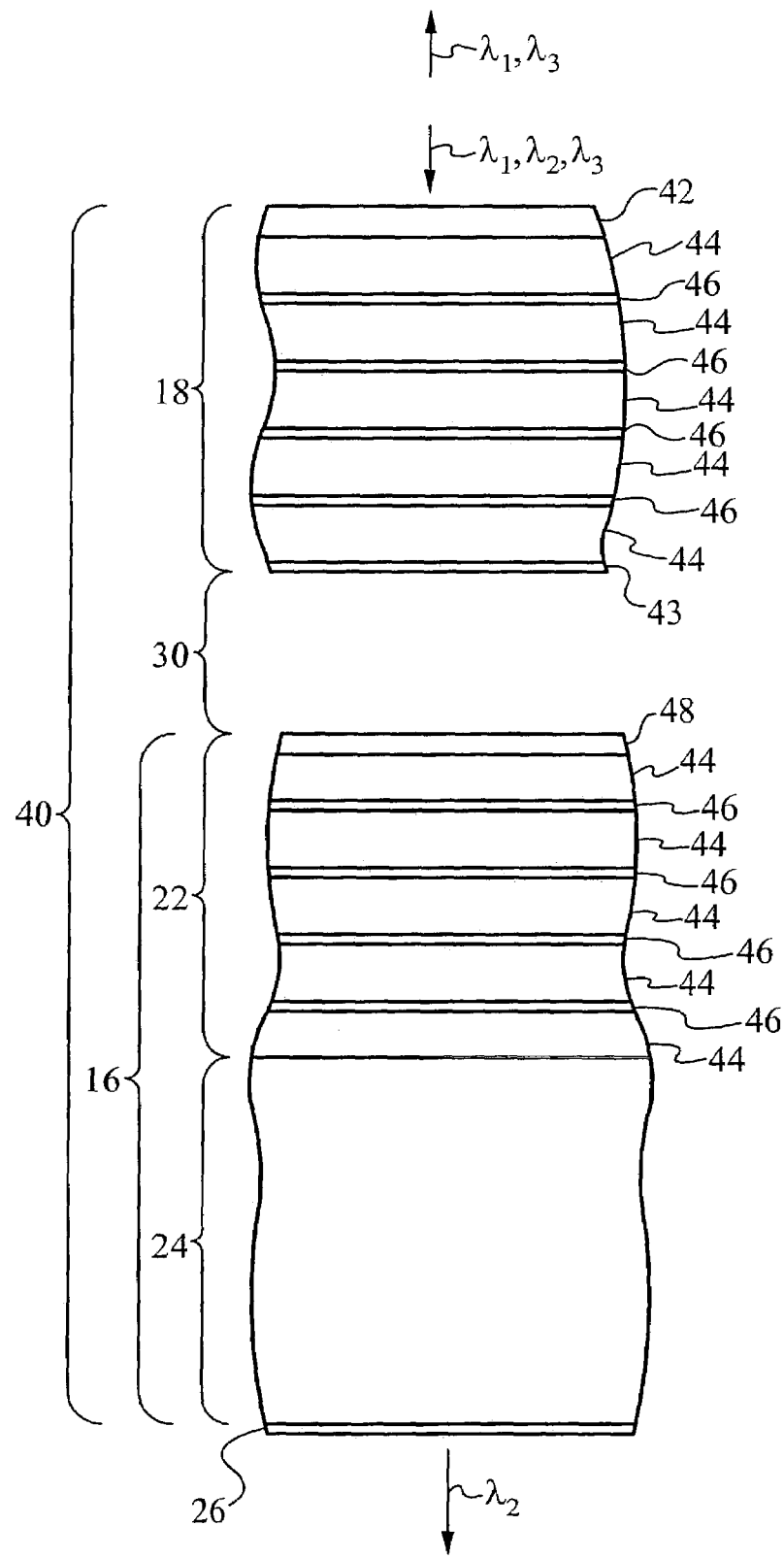
FIG. 2 illustrates a first and second multilayer reflector and a substrate of the preferred interferometer of the present invention.

A partial cross-section of the preferred interferometer 10 is further illustrated in FIG. 2. The partial cross section 40 comprises the first reflector 18 and the substrate 16. The substrate 16 comprises the second reflector 22, the transparent bulk material 24, and the anti-reflective coating 26. The first reflector 18 and the second reflector 22 form the interferometric cavity 30.

Preferably, the preferred interferometer 10 operates over telecom C and L bands, which comprises light of wavelength within the range of 1,520 to 1,620 nm. Alternatively, the preferred interferometer operates over a different light wavelength band.

It will be readily apparent to one skilled in the art that the preferred interferometer is appropriate for operation over wavelength bands other than the telecom C and L bands.

For operation over an infra-red telecommunications band, the first reflector 18 preferably comprises a first multilayer reflector. The first multilayer reflector preferably comprises first and second encapsulating layers, 42 and 43, of $Si_3N_4$ and alternating layers of low refractive index material 44 comprising $SiO_2$ and high refractive index material 46 comprising poly-Si (polycrystalline Si). Preferably, the first multilayer reflector comprises four pairs of the alternating layers plus an extra layer of the low refractive index material 44. Alternatively, the first multilayer reflector comprises more or less than four pairs of the alternating layers.

For operation over the infra-red telecommunications band, the second reflector 22 preferably comprises a second multilayer reflector. The second multilayer preferably comprises a third encapsulating layer 48 and the alternating layers of the low refractive index material 44 comprising $SiO_2$ and the high refractive index material 46 comprising poly-Si. Preferably, the second multilayer reflector comprises four pairs of the alternating layers plus an extra layer of the low refractive index material 44. Alternatively, the second multilayer reflector comprises more or less than four pairs of the alternating layers.

The first, second, and third encapsulating layers, 42, 43 and 48, and the alternating layers of the low refractive index material 44 and high index of refraction material 46 preferably comprise quarter wavelength films. Alternatively, the alternating layers comprise a range of thicknesses about a quarter wavelength, which broadens an operational wavelength band. The quarter wavelength films have optical path lengths of a quarter wavelength of an intermediate wavelength within the infra-red telecommunications band. Choosing the intermediate wavelength as 1,550 nm gives the qurater wavelength as 387.5 nm. Layer thicknesses are determined by dividing the quarter wavelength by the refractive index. Table 1 provides the refractive indexes and the layer thicknesses for $Si_3N_4$, $SiO_2$, and poly-Si.

TABLE 1

| Material | Refractive index | Layer Thickness |
| --- | --- | --- |
| $Si_3N_4$ | 2.00 | 193.8 nm |
| $SiO_2$ | 1.44 | 269.1 |
| Poly-Si | 3.63 | 106.7 |

For operation over the infra-red telecommunications band, the transparent bulk material preferably comprises Si. Alternatively, the transparent bulk material comprises $SiO_2$. The anti-reflective coating 26 preferably comprises a quarter wavelength film of $Si_3N_4$. Alternatively, the anti-reflective coating 26 comprises a quarter wavelength film of another suitable optical coating material.

$Si_3N_4$ has low optical absorption for wavelengths below 4,350 nm. Poly-Si and single crystal Si have low optical absorption for wavelengths above 850 nm. $SiO_2$ has low optical absorption over a wavelength range from 159 to 7,700 nm.

Referring to FIGS. 1 and 2, the preferred interferometer 10 is fabricated using semiconductor processing techniques of film deposition and etching. Fabrication begins with a Si wafer, which forms the transparent bulk material 24. The second reflector 22 is deposited on the Si wafer by depositing the layers of the second multilayer reflector. Next, a sacrificial layer of poly-Si is deposited onto the second reflector. Alternatively, the sacrificial layer comprises a material other than poly-Si such as $SiO_2$. (Note that in a later step, the sacrificial layer will be etched away through the release holes 21, hence it is called the "sacrificial" layer.)

Following deposition of the sacrificial layer, the sacrificial layer is etched to form an inverse of the plurality of posts 14 and to form edges of the sacrificial layer where the membrane extension 28 will couple to the substrate 16. A first layer of $Si_3N_4$ is then deposited over the sacrificial layer forming a first layer of the membrane, a first layer of the plurality of posts, and a first encapsulating layer 42 of the first multilayer reflector. Following this, the alternating layers of the low refractive index material 44 and the high refractive index material 46 are deposited on a center region of the membrane 12. A second layer of $Si_3N_4$ is deposited over the first layer of $Si_3N_4$ and over the alternating layers of the first multilayer reflector, which completes fabrication of the membrane 12, the plurality of posts 14, and the first reflector 18. The release slots 21 are then etched through the first and second layers of $Si_3N_4$ to the sacrificial layer. Preferably, $XeF_2$ gas is then used to etch the sacrificial layer through the release slots 21. The $XeF_2$ gas etches the sacrificial layer to completion, which releases the membrane 12 and forms the interferometric cavity 30. Alternatively, another selective etchant is used to etch the sacrificial layer.

An advantage of employing the sacrificial layer in the fabrication of the preferred interferometer 10 is that, because the sacrificial layer is formed with a uniform thickness, the sacrificial layer assures parallelism of the first and second reflectors, 18 and 28.

It will be readily apparent to one skilled in the art that, since the release slots 21 function to provide access to the sacrificial layer for the $XeF_2$ gas, the release slots 21 can be replaced by other access entries to the sacrificial layer such as release holes in the membrane extension 28.

Figure 3:
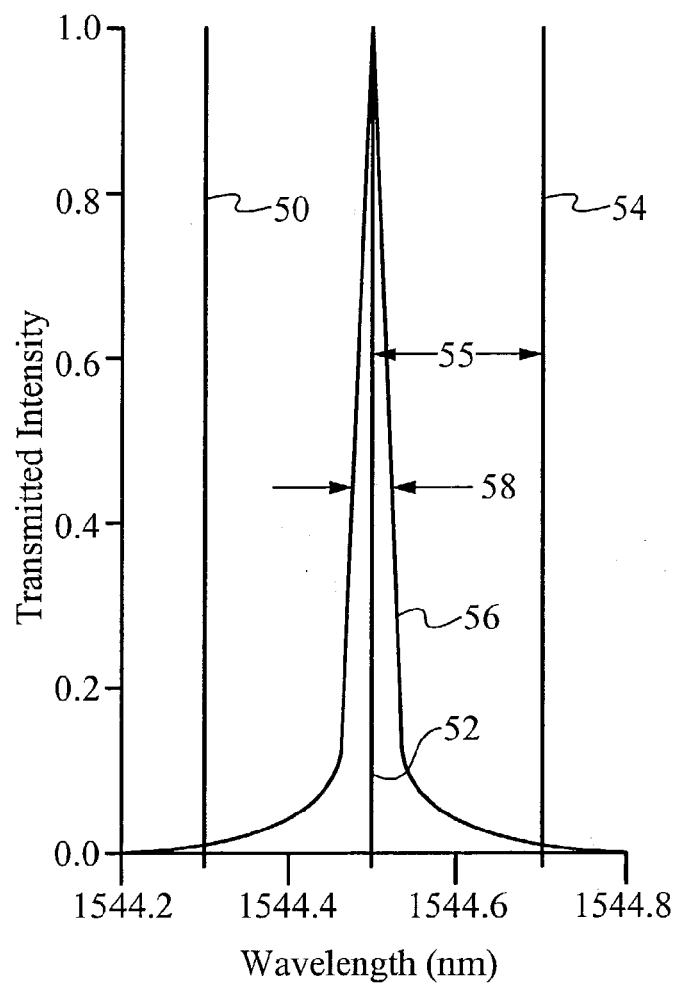
FIG. 3 graphically illustrates a transmitted wavelength of the preferred interferometer of the present invention.

FIG. 3 graphically illustrates intensities of first, second, and third VDM (wavelength division multiplex) channels, 50, 52, and 54, on a channel spacing 55 of 0.2 nm and also illustrates an interferometer transmission 56 of the preferred interferometer 10 configured for the telecom C band. The interferometer transmission 56 has a maximum transmission at 1544.5 nm, which is the wavelength of the second WDM channel 52, and has a full width half maximum 58 of 0.0300 nm. This is accomplished by adjusting the cavity length of the preferred interferometer 10 to an integral multiple of half of 1544.5 nm. Thus, directing the first, second, and third WDM channels, 50, 52, and 54, onto the preferred interferometer 10 with the cavity length adjusted to integral multiple of half of 1544.5 nm causes the first and third WDM channels, 50 and 54, to reflect from the preferred interferometer 10 and also causes the second WDM channel 52 to transmit through the preferred interferometer 10.

Figure 4:
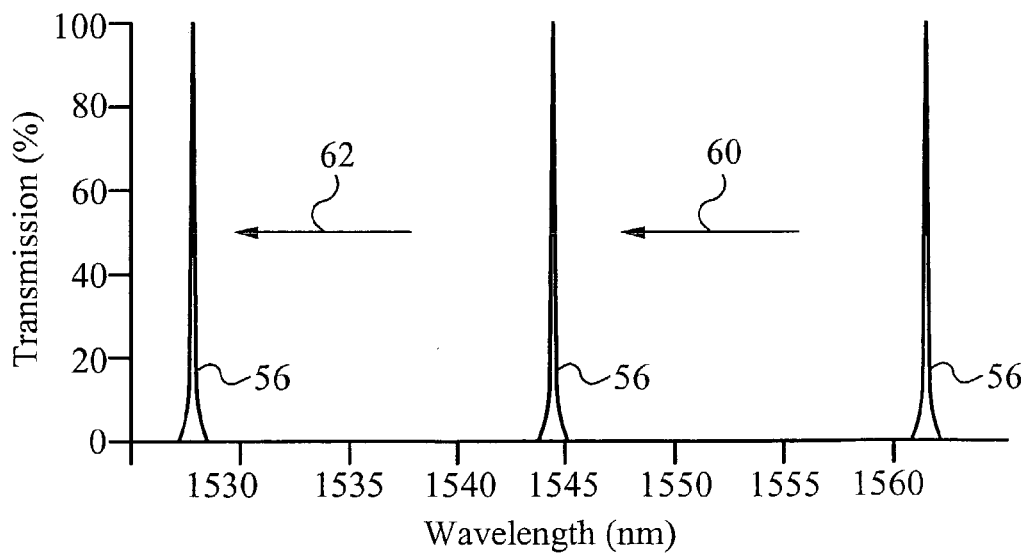
FIG. 4 graphically illustrates a transmitted wavelengths of the preferred interferometer of the present invention over a telecommunications C band.

FIG. 4 graphically illustrates the interferometer transmission 56 of the preferred interferometer 10 of the present invention tuned over the telecom C band. The preferred interferometer 10 is tuned by adjusting the cavity length of the interferometric cavity 30. The interferometric cavity 30 preferably has a non-deflected cavity length of 3,126 nm. With a 0.0 nm relative deflection of the first reflector 18, the interferometer transmission 56 occurs at 1,563.0 nm. With a 37.0 nm relative deflection 60 of the first reflector 18 towards the second reflector 22, the interferometric transmission occurs at 1,544.5 nm. With a 74.0 nm relative deflection 62 of the first reflector 18 towards the second reflector 22, the interferometric transmission occurs at 1,526.0 nm.

It will be readily apparent to one skilled in the art that the non-deflected cavity length of 3,126 nm can be replaced by a longer or shorter cavity length. If the non-deflected cavity length is replaced by a significantly longer cavity length, a larger relative deflection is needed to tune the preferred interferometer 10 to a specific wavelength. For example, if the non-deflected cavity length is 6,252 nm, twice the 37.0 nm relative deflection 60 of the first reflector towards the second reflector is needed to move the interferometric transmission to 1,544.5 nm. If the non-deflected cavity length is replaced by a significantly shorter cavity length, a smaller relative deflection is needed to tune the preferred interferometer to the specific wavelength. For example, if the non-deflected cavity length is 1,563 nm, half the 37.0 nm relative deflection 60 is needed to tune the preferred interferometer to 1,544.5 nm.

Figure 5:
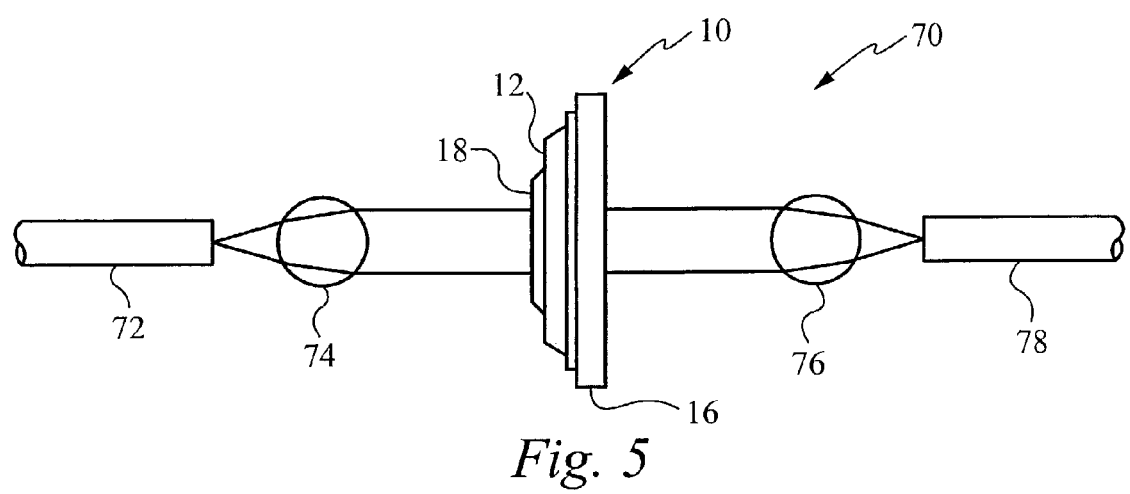
FIG. 5 illustrates a WDM (wavelength division multiplex) channel monitor employing the preferred interferometer of the present invention.

A WDM channel monitor employing the preferred interferometer 10 of the present invention is illustrated in FIG. 5. The WDM channel monitor 70 comprises an input optical fiber 72, a first collimating lens 74, the preferred interferometer 10, a second collimating lens 76, and an output optical fiber 78. The first ball lens 74 couples the input optical fiber 72 to the preferred interferometer 10. The second ball lens 76 couples the preferred interferometer 10 to the output optical fiber 78. Preferably, the output optical fiber 78 couples to a photodetector (not shown), which is coupled to electronics (not shown). Alternatively, the output optical fiber 78 couples to downstream optical network components.

In operation of the WDM channel monitor 70, the first reflector 18 is resonated to cause an interferometric transmission to sweep across a wavelength band. The photodetector detects the interferometric transmission and outputs a photodetector signal to the electronics. The electronics process the photodetector signal to provide individual channel power for WDM channels across the wavelength band.

Figure 6:
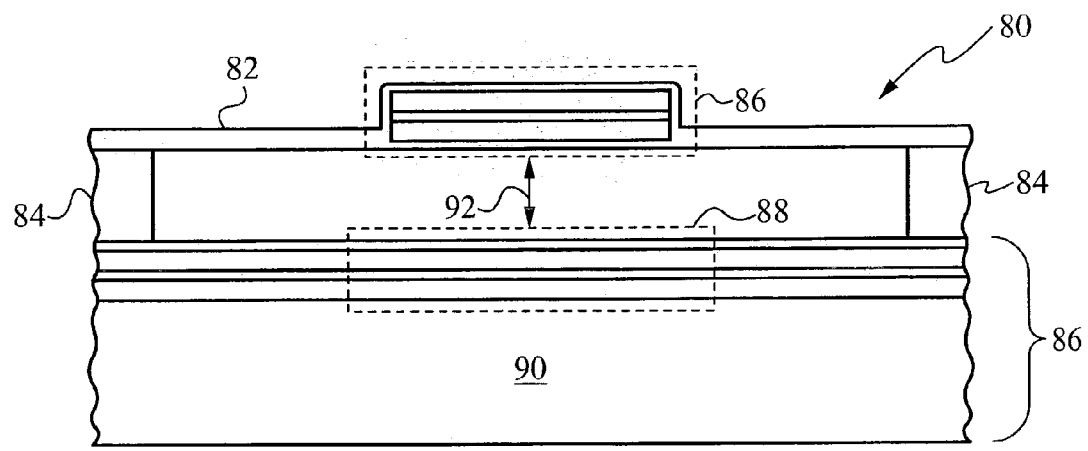
FIG. 6 illustrates a first alternative interferometer of the present invention.

A first alternative interferometer of the present invention is illustrated in FIG. 6. The first alternative interferometer 80 comprises an alternative membrane 82, a spacer layer 84, and an alternative substrate 86. The alternative membrane 82 comprises a third reflector 86. The alternative substrate comprises a fourth reflector 88 and a transparent bulk material 90. In the alternative interferometer 80, the third and fourth reflectors, 86 and 88, form an alternative interferometric cavity 92. In the alternative interferometer 80, the spacer layer 84 couples the alternative membrane 82 to the substrate 86.

It will be readily apparent to one skilled in the art that other various modifications may be made to the embodiments without departing from the spirit and scope of the invention as defined by the appended claims.

I claim:

1. An interferometer comprising:
a) a membrane comprising a first reflector;
b) a substrate comprising a second reflector; and
c) a support structure circumferentially coupling the membrane to the substrate and orienting the first reflector of the membrane parallel to and facing the second reflector of the substrate,
wherein the support structure maintains the membrane in bi-axial tension using first and second couplings to the substrate, the second coupling being further distant from the first reflector than the first coupling.

2. The interferometer of claim 1 wherein the first coupling comprises a support mechanism arranged around the first reflector, and the second coupling comprises a surrounding connection to the substrate outside of the support mechanism.

3. The interferometer of claim 2 wherein the membrane comprises a resilient material.

4. The interferometer of claim 3 wherein the support mechanism comprises a plurality of posts arranged in a proximately circular pattern around the first reflector.

5. The interferometer of claim 4 wherein the surrounding connection comprises a continuation of the membrane which couples to the substrate outside of the plurality of posts.

6. The interferometer of claim 3 wherein the support structure comprises a support layer.

7. The interferometer of claim 3 wherein the first reflector comprises a first multilayer reflector.

8. The interferometer of claim 7 wherein the second reflector comprises a second multilayer reflector.

9. The interferometer of claim 8 wherein the substrate further comprises a transparent bulk material.

10. The interferometer of claim 9 wherein a through optical path comprises a transparent bulk material.

11. The interferometer of claim 10 wherein the trough optical path further comprises an anti-reflective coating coupled to a surface of the substrate opposite to the second multilayer reflector.

12. The interferometer of claim 8 wherein the resilient material transmits light.

13. The interferometer of claim 12 wherein the resilient material encapsulates the first multilayer reflector.

14. The interferometer of claim 13 wherein the first multilayer reflector comprises a first multilayer stack of silicon and silicon dioxide, and further wherein the resilient material comprises silicon nitride.

15. The interferometer of claim 14 wherein the second multilayer reflector comprises a second multilayer stack of silicon and silicon dioxide.

16. The interferometer of claim 15 wherein at least a first silicon layer of the first multilayer stack of silicon and silicon dioxide includes sufficient doping to provide electrical conductivity, thereby forming a first conductive layer, and further wherein at least one silicon layer of the second multilayer stack of silicon and silicon dioxide includes sufficient doping to provide electrical conductivity, thereby forming a second conductive layer.

17. The interferometer of claim 16 wherein a space between the first and second multilayer stacks of silicon and silicon dioxide forms an interferometric cavity and further wherein an electrical bias applied between the first and second conductive layers adjusts a cavity length of the interferometric cavity.

18. The interferometer of claim 17 wherein the membrane further comprises access holes, the access holes providing access to the interferometric cavity for an etchant during fabrication.

19. An interferometer comprising:
  a) a membrane maintained in biaxial tension comprising an annular member and a first multilayer stack of silicon and silicon dioxide encapsulated by first and second silicon nitride layers;
  b) a substrate comprising a silicon bulk material and a second multilayer stack of silicon and silicon dioxide; and
  c) a support structure coupling the membrane to the substrate and orienting the first multilayer stack of silicon and silicon dioxide parallel to and facing the second multilayer stack of silicon and silicon dioxide.

20. An interferometer comprising:
  a) first means for reflecting maintained in biaxial tension;
  b) second means for reflecting coupled to the first means for reflecting, the first means for reflecting oriented parallel to and facing the second means for reflecting; and
  c) means for electrically biasing the first means for reflecting relative to the second means for reflecting.

* * * * *